(12) United States Patent
Pradadarao

(10) Patent No.: US 7,917,901 B2
(45) Date of Patent: Mar. 29, 2011

(54) MAINTAINABLE DYNAMIC INSTRUMENTATION TECHNIQUE FOR CHANGING VERSIONS OF SOFTWARE

(75) Inventor: Akulavenkatavara Pradadarao, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 1269 days.

(21) Appl. No.: 11/462,957

(22) Filed: Aug. 7, 2006

(65) Prior Publication Data

US 2008/0052696 A1   Feb. 28, 2008

(51) Int. Cl.
G06F 9/45   (2006.01)
G06F 11/00   (2006.01)

(52) U.S. Cl. ........... 717/158; 717/130; 717/131; 714/38
(58) Field of Classification Search .................. None
See application file for complete search history.

(56) References Cited

U.S. PATENT DOCUMENTS

| | | | |
|---|---|---|---|
| 6,311,327 B1 * | 10/2001 | O'Brien et al. | 717/114 |
| 6,862,696 B1 | 3/2005 | Voas et al. | |
| 6,898,764 B2 | 5/2005 | Kemp | |
| 6,898,785 B2 * | 5/2005 | Ramasamy et al. | 717/129 |
| 6,918,110 B2 * | 7/2005 | Hundt et al. | 717/158 |
| 7,313,734 B2 * | 12/2007 | DeWitt et al. | 714/45 |
| 7,350,196 B1 * | 3/2008 | Cantrill | 717/128 |
| 7,568,186 B2 * | 7/2009 | Bhattacharya | 717/130 |
| 2002/0199172 A1 * | 12/2002 | Bunnell | 717/128 |
| 2003/0212988 A1 * | 11/2003 | Tsai et al. | 717/130 |
| 2004/0003375 A1 * | 1/2004 | George et al. | 717/124 |
| 2004/0117760 A1 | 6/2004 | McFarling | |
| 2004/0123279 A1 * | 6/2004 | Boykin et al. | 717/158 |
| 2007/0103175 A1 * | 5/2007 | Eigler | 324/754 |

OTHER PUBLICATIONS

V. Prasad et al, "Locating System Problems Using Dynamic Instrumentation," OLS, Jul. 15, 2005, 16 pages.

* cited by examiner

*Primary Examiner* — Tuan Q Dam
*Assistant Examiner* — Isaac T Tecklu
(74) *Attorney, Agent, or Firm* — Walter W. Duft

(57) ABSTRACT

A technique for the dynamic instrumentation of a running software system. One or more callable instrumentation functions are accessible in a first memory space associated with the software system. The one or more callable instrumentation functions are adapted to probe an operation of the software system and return data regarding the probed operation. Probed operation environment information needed by the one or more instrumentation functions is provided to a second memory space associated with the software system. First memory space addresses associated with the probed operation environment information are determined from a resource that is accessible in the second memory space. A probe handler is generated that includes calls to the one or more instrumentation functions with references to the first memory space addresses. The probe handler is callable as part of the probed operation.

30 Claims, 5 Drawing Sheets

| PROBE POINT/ INSTRUMENTATION FUNCTION DBMS ||||
|---|---|---|---|
| PROBE POINT | INSTR. FUNCTION | PROBED FUNCTION ARGUMENTS | PROBED FUNCTION INTERNAL VARIABLES |
| SYS_READ() | PROBE_ON_SYS_READ() | fd, buf, count | bytes read (ret) |
| SYS_WRITE() | PROBE_ON_SYS_WRITE() | fd, buf, count | bytes written (ret) |
| ... | ... | | |

*FIG. 3*

MAINTAINABLE DYNAMIC INSTRUMENTATION TECHNIQUE FOR CHANGING VERSIONS OF SOFTWARE

BACKGROUND OF THE INVENTION

1. Field of the Invention

The present invention relates to diagnostic tools for analyzing software. More particularly, the invention is directed to the dynamic instrumentation of running software in order to gather runtime data as the software executes. Still more particularly, the invention concerns a technique for implementing a portable dynamic instrumentation tool that accommodates variations in execution environment that arise from differences in compiler versions, compile options, hardware platform particulars and other parameters.

2. Description of the Prior Art

By way of background, in order to analyze the operation of a complex system such as a large software program, it is important to be able to gather operational information while the system is running, without halting execution, modifying the system, and then restarting it. One approach is to dynamically add instrumentation code to the running system when data is needed, so that there is no performance penalty. This is in contrast to statically instrumenting the system when it is created, which offers no flexibility. Operating systems are examples of complex systems that may require diagnosis at run time. As shown in FIG. 1A, it is often desirable to probe some kernel function to determine information about its operation, such as how often or why the function is being called. The kernel memory location where the function is to be probed is referred to as the probe point. As shown in FIG. 1B, dynamic instrumentation involves adding a software interrupt at the probe point in the running system and providing a probe handler that is executed when the interrupt throws an exception. The probe handler executes instrumentation code (instrumentation function) that obtains the required information and provides it to the probe user, then returns control to the running system. Examples of such conventional dynamic instrumentation software include the Linux® System Tap framework. This framework provides a Linux® tool that allows application developers and system administrators to write probe scripts that will be automatically parsed, elaborated upon, translated, compiled and loaded as a kernel module to generate probe data from a running kernel.

One problem with conventional instrumentation solutions is that the probe handler needs the same execution environment as that of the function being interrrupted, including access to local variables and arguments. Unfortunately, the location of local variables and arguments is not fixed, and depends on various parameters such as the compiler version used to compile the operating system, and the compile options and hardware platform type specified during compilation. For this reason, local variables and arguments can not be easily accessed in the probe handler without consulting additional debug information. It is not desirable to access debug information from a probe handler insofar as this information is generally not readily available to the operating system. For example, the kernel debug information is typically maintained in a file system that is readiliy accessible in user space but not from kernel context. Due to this problem, it is not easy to write dynamic instrumentation code in a portable form. The only known alternative is to write the probe handler code for a specific version of the compiler, compile options and platform being utilized. It will be appreciated that this method is not desirable insofar as it is not practical or economical to write such code.

Accordingly, it would be desirable to provide a techinque whereby a probe handler could reference the same execution environment as that of the function being interrupted without consulting debug information from the handler. The technique should be powerful enough so that it can be extended to dynamically add new functionality or fix a problem in an existing system without taking the system down.

SUMMARY OF THE INVENTION

The foregoing problems are solved and an advance in the art is obtained by a novel method, system and computer program product for the dynamic instrumentation of a running software system. One or more callable instrumentation functions are accessible in a first memory space associated with the software system. The one or more callable instrumentation functions are adapted to probe an operation of the software system and return data regarding the probed operation. Probed operation environment information needed by the one or more instrumentation functions is provided to a second memory space associated with the software system. First memory space addresses associated with the probed operation environment information are determined from a resource that is accessible in the second memory space. A probe handler is generated that includes calls to the one or more instrumentation functions with references to the first memory space addresses. The probe handler is callable as part of the probed operation.

According to exemplary embodiments disclosed herein, the software system may be an operating system kernel, the first memory space may be a privileged memory space in which the operating system kernel resides, and the second memory space may be a non-privileged memory space in which user applications reside. The one or more callable instrumentation functions may be placed in the first memory space in conjunction with the software system being placed in the first memory space. The probed operation environment information may comprise function arguments and local variables, and may be provided to the second memory space by way of a registration interface in the first memory space that allows the one or more callable instrumentation functions to register the probed operation environment information. A database management system may also be provided in the first memory space that associates the one or more instrumentation functions and the registered probed operation environment information with the probed operation. The first memory space may further include communication logic that receives the probed operation environment information from the database management system and provides it to the second memory space. The first memory space addresses may be determined from a debug information resource in a file system that is accessible from the second memory space. The probe handler may be generated based on a probe script provided in the second memory space.

In another aspect, the invention may be thought of as providing support for dynamic instrumentation of a running software system by establishing build-independent core instrumentation logic and build-dependent dynamic instrumentation logic. The core instrumentation logic is adapted to probe an operation of the software system and obtain data regarding the probed operation. The core instrumentation logic is independent of build parameters used to compile the software system. The dynamic instrumentation logic provides build-dependent probed operation environment information to the core instrumentation logic. The probed operation environment information is dependent on build parameters used to compile the software system. The core instrumentation logic is adapted to use the build-dependent probed operation environment information to probe an operation of the software system. A first interface may be provided that enables the core instrumentation logic to provide a specification of build-independent probed operation environment information to a dynamic instrumentation logic generator. A second interface may be provided that allows the dynamic instrumentation logic to provide build-dependent probed operation environment information to the core instrumentation logic when the latter is invoked.

In a further aspect, the invention may be thought of as providing support for dynamic instrumentation of a running software system by establishing an architecture adapted to create dynamic instrumentation code for probing an operation of the software system and exporting data regarding the probed operation. The architecture is adapted to generate a specification of build-independent probed operation environment information that is required to instrument the software system. The architecture is further adapted to consult an information resource associated with the software system in order to obtain build-dependent probed operation environment information based on the specification that is dependent on build parameters used to compile the software system. The architecture is still further adapted to generate a dynamic instrumentation module that uses the build-dependent probed operation environment information to probe the software system. The architecture may be implemented with a core instrumentation logic module, a dynamic instrumentation logic generator and a dynamic instrumentation module. The core instrumentation module is adapted to probe an operation of the software system using the build-dependent probed operation environment information and to obtain data regarding the probed operation. The dynamic instrumentation logic generator creates the dynamic instrumentation module. The core instrumentation logic further provides the specification of the build-independent probed operation environment information to the dynamic instrumentation logic generator. The dynamic instrumentation logic generator uses the specification to consult the information resource associated with the software system and obtain the build-dependent probed operation environment information used to create the dynamic instrumentation logic. The dynamic instrumentation module provides the build-dependent probed operation environment information to the core instrumentation logic module.

BRIEF DESCRIPTION OF THE DRAWINGS

The foregoing and other features and advantages of the invention will be apparent from the following more particular description of exemplary embodiments of the invention, as illustrated in the accompanying Drawings, in which:

FIG. 3 is a diagrammatic illustration of a database management system maintained by a central module of the dynamic instrumentation system of FIG. 2;

DETAILED DESCRIPTION OF EXEMPLARY EMBODIMENTS

Figure 1A:
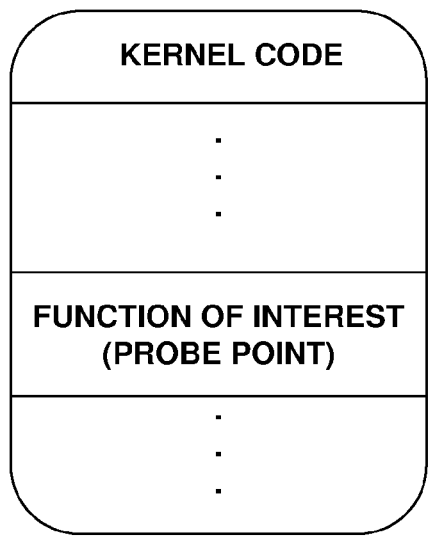
FIG. 1A is a diagrammatic illustration of a portion of a kernel memory space containing operating system kernel code, including a function of interest to be probed using a prior art technique.
Figure 1B:
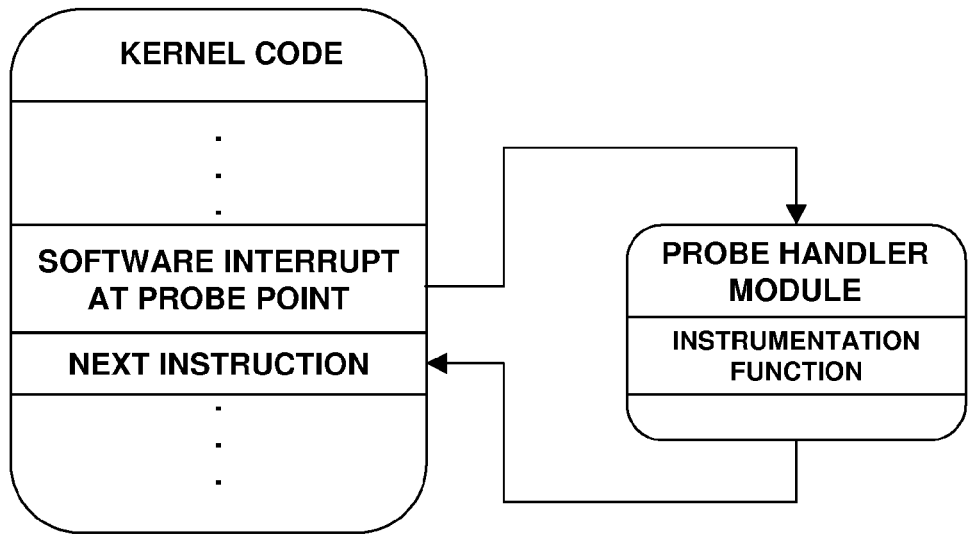
FIG. 1B is a diagrammatic illustration of the kernel memory space portion of FIG. 1A showing the insertion of a software interrupt at a probe point associated with the function of interest and further showing another kernel memory space portion containing a probe handler module that executes an instrumentation function according to a prior art technique.
Figure 2:
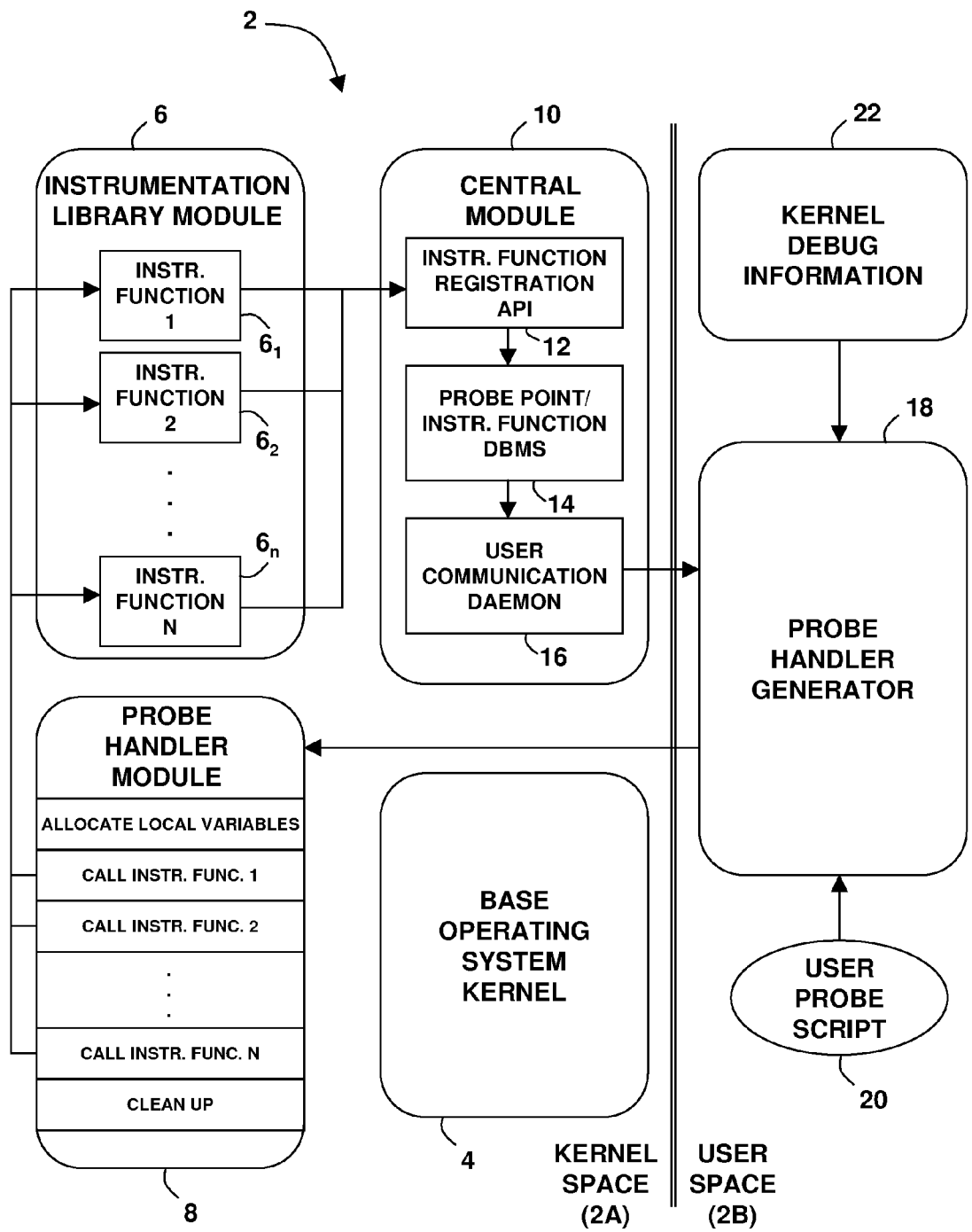
FIG. 2 is a is a functional block diagram showing components of a dynamic instrumentation system adapted to perform dynamic instrumentation of running software in accordance with the invention.

Turning now to the Drawing figures wherein like reference numerals indicate like components in all of the several views, FIG. 2 illustrates an exemplary dynamic instrumentation system 2. Although the instrumentation system 2 may be variously implemented in software, firmware, hardware, or any combination thereof, the following discussion is based on an exemplary embodiment wherein the instrumentation system 2 comprises software program logic that is capable of execution on commodity data processing systems, including personal computers, workstations, as well as more complex hardware such as midrange and mainframe computers. According to this exemplary software implementation, the software logic of the instrumentation system 2 may collectively reside in a first memory space 2A (shown on the left-hand side of FIG. 2) and a second memory space 2B (shown on the right-hand side of FIG. 2), so as to be available for execution on a central processing unit (CPU) (see discussion of FIG. 5 below). A software system 4, representing a dynamic instrumentation target, additionally resides in the first memory space 2A. To further facilitate the present discussion, it will be assumed by way of example only that the software system 4 represents a base operating system, such as the Linux® kernel, and that the first memory space 2A comprises an operating system kernel memory (e.g., a privileged memory space) in which the software system 4 resides, and a second memory space 2B that may be a user application memory space (e.g., a non-privileged memory space) in which resides user applications. It should be understood that the disclosed embodiment represents only one exemplary implementation of the invention, and that the dynamic instrumentation system 2 could also be used with other types of software system 4.

The instrumentation system 2 is adapted to provide dynamic instrumentation of the software system 4 to facilitate runtime diagnosis thereof. As described by way of background above, dynamic instrumentation refers to the ability to dynamically insert instrumentation code in a running system, as opposed to statically inserting the instrumentation code at compile time. The dynamic instrumentation system 2 provides such dynamic instrumentation capability while offering the additional capability of accessing the same execution environment (e.g. local variables and arguments) as the software system 4 without regard to how the software system 4 was compiled, the compiler options that were used, or the hardware platform type specified during compilation. To that end, the instrumentation system 2 includes one or more core instrumentation functions $6_1, 6_2 \ldots 6_n$ representing probe logic that is accessible within the first memory space 2A. According to the present embodiment in which the software system 4 is exemplified as an operating system kernel, the instrumentation functions $6_1, 6_2 \ldots 6_n$ may be loaded as executable code into the first memory space 2A in conjunction with the kernel (software system 4) as a kernel module. This kernel module is shown in FIG. 2 as an instrumentation library module 6. The one or more instrumentation functions $6_1, 6_2 \ldots 6_n$ are adapted to probe operations of the software system 4 and export data regarding the probed operations. The instrumentation functions are considered to be build-independent because they are not hard-coded with the memory addresses of the arguments and local variables of the software system operations they are designed to probe, which are build-dependent.

Each instrumentation function $6_1, 6_2 \ldots 6_n$ is designed to probe a particular operation of the software system 4, such as a kernel function if the software system 4 is an operating system kernel. For example, if the software system 4 is a Linux® kernel, the instrumentation function $6_1$ might be designed to probe the Linux® kernel function known as sys_read( ), which is a service function for the read( ) system call used to read data from a file. Similarly, the instrumentation function $6_2$ might be designed to probe the Linux® kernel function known as sys_write( ), which is a service function for the write( ) system call used to write data to a file. The other instrumentation functions $6_3$-$6_n$ may be designed to probe other Linux kernel functions. One purpose of the instrumentation functions $6_1$ and $6_2$ might be to generate a tally of the frequency at which the sys_read( ) or sys_write( ) system calls are invoked, the files that are involved, the number of bytes being read and written, and what applications are accessing the files.

The Linux® sys read( ) and sys write( ) functions take the arguments "fd," "buf" and "count," where "fd" is the file descriptor of the file to be accessed, "buf" is the memory buffer address for the data to be transferred, and "count" is the number of bytes to be transferred. The Linux® sys read( ) and sys write( ) functions use the internal variable "ret" to track the number of bytes transferred (and return this value to the caller). The foregoing function arguments and internal variables of the sys_read( ) and sys_write( ) functions may be referred to as probed operation environment information. It is assumed that there will be some instrumentation function (e.g., $6_1$ or $6_2$) that operates on such environment information when probing the function in question.

Because the instrumentation functions $6_1, 6_2 \ldots 6_n$ do not know the build-dependent addresses of their probed operation environment information in advance, the instrumentation functions $6_1, 6_2 \ldots 6_n$ may be written as callable functions that can be passed the required information as arguments when the instrumentation functions are invoked. As described in more detail below, a dynamic probe handler module 8 is loaded into the first memory space 2A (as executable code) for this purpose. Three basic tasks of the probe handler module 8 are to allocate local variables, call one or more of the instrumentation functions $6_1, 6_2 \ldots 6_n$, and perform routine memory clean up operations when probe execution has terminated. The probe handler module 8 is also responsible for exporting probe results to the second memory space 2B for user consumption. Alternatively, the instrumentation functions $6_1, 6_2 \ldots 6_n$ could be designed to export their results directly.

Before the probe handler module 8 can be generated and loaded into the first memory space 2A, a technique is needed for determining the build-dependent memory addresses of the probed operation environment information for use by the instrumentation functions $6_1, 6_2 \ldots 6_n$. An exemplary technique used by the instrumentation system 2 is to provide a specification of the probed operation environment information needed by the instrumentation functions $6_1, 6_2 \ldots 6_n$ to the second memory space 2B associated with the software system 4. Using this specification, the required address information can be obtained in the second memory space 2B and used to generate the probe handler 8.

A central module 10 accessible within the first memory space 2A allows all probed operation environment information used by the instrumentation functions $6_1, 6_2 \ldots 6_n$ to be specified to the second memory space 2B. The central module 10 may include an instrumentation function registration API (application program interface) 12, a probe point/instrumentation function database management system (DBMS) 14, and a user communication daemon 16. The instrumentation function API 12 provides an interface that the instrumentation functions $6_1, 6_2 \ldots 6_n$ may use to register their probed operation environment information with the central module 10. This registration may be performed when the instrumentation library module 6 is first activated, and whenever new instrumentation functions are added. The registration information may include the name of the instrumentation function $6_1, 6_2 \ldots 6_n$, the operation in the software system 4 to be probed by the instrumentation function, and the probed operation environment information.

The DBMS 14 maintains a database that stores the registration information registered via the instrumentation function API 12. It associates the one or more instrumentation functions $6_1, 6_2 \ldots 6_n$ and their probed operation environment information with the probed operations. For example, as shown in FIG. 3, and if the software system 4 is a Linux® kernel, an instrumentation function known as "probe_on_sys_read( )" (e.g., instrumentation function $6_1$ in FIG. 2) is associated with the sys_read( ) kernel function as the probe point, together with the function arguments and local variables of the sys_read( ) function as the probed operation environment information. Similarly, an instrumentation function known as "probe_on_sys_write( )" (e.g., instrumentation function $6_2$ in FIG. 2) is associated with the sys_write( ) kernel function as the probe point, together with the function arguments and local variables of the sys_write( ) function as the probed operation environment information.

The user communication daemon 16 represents executable code that provides a communication mechanism for passing the probed operation environment information stored in the DBMS 14 to a probe handler generator 18 associated with the second memory space 2B. The communication daemon 16 may implement a "push" mechanism that passes the contents of the DBMS 14 to the probe handler generator 18 whenever there is a change in the DBMS (e.g. when an instrumentation function registers with the registration API 12). This information may be stored in any suitable fashion in the user space 2B, such as in a memory buffer or a disk file accessible to the probe handler generator 18. Alternatively, the communication daemon 16 could implement a "pull" mechanism whereby the contents of the DBMS 14 are only provided to the probe handler generator 18 upon the latter's request.

The probed operation environment information received from the communication daemon 16 is build-independent because it does not comprise actual memory addresses in the first memory space 2A, only argument and internal variable names. In order to generate build-dependent probed operation environment information, the probe handler generator 18 obtains the (first memory space) addresses associated with the probed operation environment information from a resource that is accessible in the second memory space 2B. A debug information resource stored in a file system that is accessible from the second memory space 2B may be used for this purpose. For example, as shown in FIG. 2, if the software system 4 is an operating system kernel, this resource could be a conventional file or directory that maintains kernel debug information 22 (e.g., the Linux® System.map symbol table). The kernel debug information 22 represents information that can be generated and preserved during conventional compilation of an operating system kernel. Similar resources may be created during the compilation of other types of the software system 4, using known techniques. Thus, using the build-independent information obtained from the communication daemon 16, the probe handler generator 18 can obtain the build-dependent (first address space) memory address of all probed operation environment information required by the instrumentation function(s) associated with the probed operation.

Having obtained the first memory space addresses for the probed operation environment information, the probe handler generator 18 constructs the probe handler module 8 according to the user probe script 20. In this regard, the probe handler generator 18 may be implemented using conventional instrumentation techniques such as those used in the open source Linux® System Tap framework described by way of background above. Such instrumentation techniques have applicability not only to the present embodiment wherein the software system 4 is exemplified as an operating system kernel, but to many other types of software system 4, such as application programs, runtime libraries, etc. Once the probe handler 8 is generated in the second memory space 2B, the probe handler generator 18 loads it into the first memory space 2A for operation as build-dependent dynamic instrumentation logic.

As described above, the probe handler module 8 includes calls to one or more of the instrumentation functions $6_1, 6_2 \ldots 6_n$. These function calls pass references (e.g., pointers) to the first memory space addresses for the probed operation environment information obtained from a second memory space resource such as the kernel debug information 22. The core build-independent logic of the instrumentation functions $6_1, 6_2 \ldots 6_n$ may thereby be invoked using the build-dependent probed operation environment information obtained from the second memory space 2B. Advantageously, the build-independent logic of the instrumentation functions $6_1, 6_2 \ldots 6_n$ can be used without modification in a large number of environments that vary according to compiler selection, compile options and hardware platform. Using the dynamic instrumentation technique described above, all build-dependent probed operation environment information can be readily obtained and utilized by the core instrumentation function logic.

Figure 4:
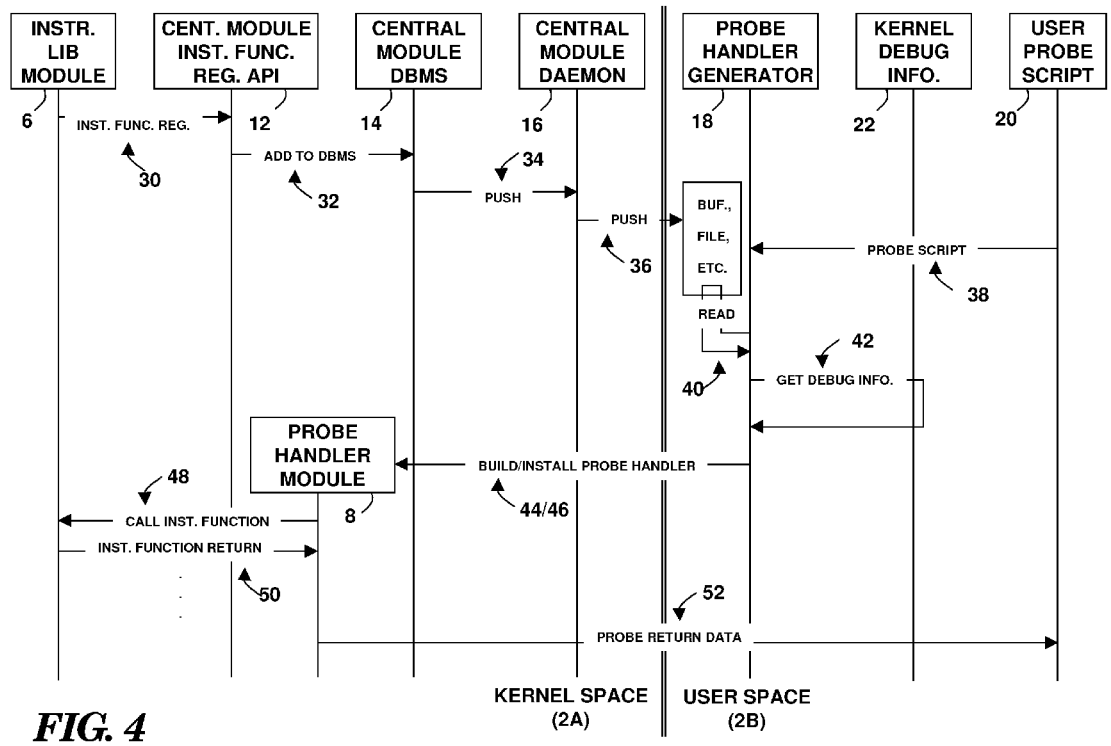
FIG. 4 is a flow diagram showing dynamic instrumentation functions performed by the dynamic instrumentation system of FIG. 2.

Turning now to FIG. 4, the operations performed by the various logic entities of the instrumentation system 2 may be further understood when viewed within the context of a flow diagram. The following assumes that the instrumentation module 6 and the central module 10 have been loaded in the first memory space 2A, and that the probe handler generator 18 is operational in the second memory space 2B. In step 30 of FIG. 4, the instrumentation functions $6_1, 6_2 \ldots 6_n$ register with the central module 10 via the instrumentation function registration API 12. In step 32, the instrumentation function API 12 populates the probe point/instrumentation function DBMS 14 based on the registration information provided in step 30. In step 34, the DBMS 14 pushes new database entries to the communication daemon 16. In step 36, the communication daemon 16 pushes the new database entries to the user space 2B. As described above, each entry will identify an instrumentation function, along with the associated probe point and probed operation environment information.

In step 38, a user probe script 20 is submitted to the probe handler generator 18. The probe handler generator 18 parses the user probe script 20 and determines the operation(s) of the software system 4 to be probed. In step 40, the probe handler generator 18 retrieves the database information from the location in the user space 2B where it was placed by the communication daemon 16 (e.g., a buffer, a file, etc.). In step 42, the probe handler generator 18 consults the resource in the second memory space 2B that maintains the first memory addresses for the probed operation environment information. As an example, if the software system 4 is an operating system kernel, this could be the file or directory resource that stores the kernel debug information 22. In step 44, the probe handler generator 18 constructs the probe handler module 8 (e.g. as a compiled kernel module). As described above, the probe handler module 8 is designed to call all instrumentation functions $6_1, 6_2 \ldots 6_n$ corresponding to probed operations specified in the user probe script 20, and to pass references to the first memory space addresses determined in the second memory space resource (e.g., the kernel debug information 22) as parameters.

In step 46, the probe handler generator 18 loads the probe handler module 8 in the first memory space 2A. The module loading procedure, which is conventional in nature, will set a software interrupt in the software system 4 at the desired probe point(s). When the probe handler module 8 is invoked by the software interrupt, it calls one of the instrumentation functions $6_1, 6_2 \ldots 6_n$ in step 48. The called instrumentation function $6_1, 6_2 \ldots 6_n$ returns from processing to the probe handler module 8 in step 50. If the probe handler module 8 is adapted to export probe return data, the return from the called instrumentation function $6_1, 6_2 \ldots 6_n$ will include this data. The probe return data can then be exported to the second memory space 2B in step 52.

Figure 5:
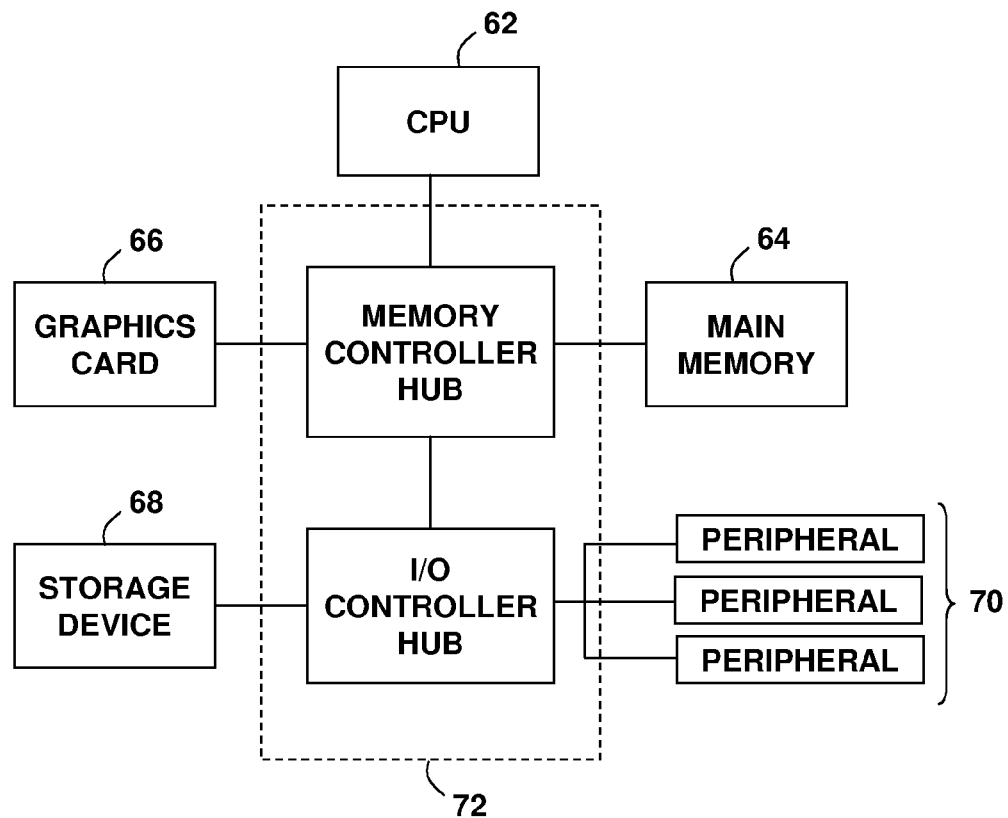
FIG. 5 is a block diagram showing an exemplary hardware environment that may be used to host the dynamic instrumentation system of FIG. 2.

Accordingly, a technique for dynamic instrumentation of running software has been disclosed. It will be appreciated that the foregoing concepts may be variously embodied in any of a data processing system, a machine implemented method, and a computer program product in which programming logic is provided by one or more machine-readable media for use in controlling a data processing system to perform the required functions. Relative to a data processing system and machine implemented method, FIG. 5 illustrates an exemplary hardware environment 60 is shown in which the instrumentation system 2 may be implemented. The hardware environment 60 includes a CPU or other data processing resource 62, a physical memory 64 providing the first memory space 2A and the second memory space 2B, a graphics card 66 for generating visual output to a monitor (not shown), a peripheral storage device 68, other peripheral devices 70, and a bus infrastructure 72 interconnecting the foregoing elements. The instrumentation library 6, the probe handler module 8, the central module 10 and its API, DBMS, and communication components 12, 14 and 16, and the probe handler generator 18 may all be loaded in the physical memory 64. The kernel debug information 22 or other resource storing first memory space addresses for probed operation environment information may reside on the storage device 68. The user probe script 20 may be input through user interaction with peripheral devices 70 (e.g., keyboard, mouse, etc.).

Figure 6:
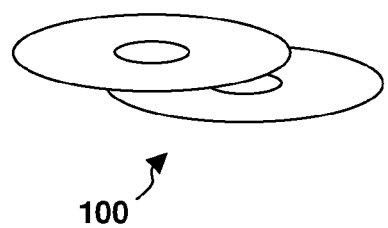
FIG. 6 is a diagrammatic illustration showing physical media that may be used to provide a computer program product for implementing a dynamic instrumentation system in accordance with the invention.

Relative to a computer program product having a machine-readable media and programming logic for controlling a data processing system, exemplary machine-readable media for providing such programming logic are shown by reference numeral 100 in FIG. 6. The media 100 are shown as being portable optical storage disks of the type that are conventionally used for commercial software sales, such as compact disk-read only memory (CD-ROM) disks, compact disk-read/write (CD-R/W) disks, and digital versatile disks (DVDs). Such media can store the programming logic of the invention, either alone or in conjunction with another software product that incorporates the required functionality. The programming logic could also be provided by portable magnetic media (such as floppy disks, flash memory sticks, etc.), or magnetic media combined with drive systems (e.g. disk drives), or media incorporated in data processing platforms, such as random access memory (RAM), read-only memory (ROM) or other semiconductor or solid state memory. More broadly, the media could comprise any electronic, magnetic, optical, electromagnetic, infrared, semiconductor system or apparatus or device, transmission or propagation signal or signal-carrying medium (such as a network), or other entity that can contain, store, communicate, propagate or transport the programming logic for use by or in connection with a data processing system, computer or other instruction execution system, apparatus or device.

Although various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method for the dynamic instrumentation of a running software system, comprising:
   providing one or more callable instrumentation functions that are accessible in a first memory space associated with said software system;
   said one or more callable instrumentation functions being adapted to probe an operation of said software system and return data regarding said probed operation;
   providing probed operation environment information needed by said one or more instrumentation functions to a second memory space associated with said software system;
   determining first memory space addresses associated with said probed operation environment information from a resource that is accessible in said second memory space; and
   generating a probe handler that includes calls to said one or more instrumentation functions with references to said first memory space addresses, said probe handler being callable as part of said probed operation.

2. A method in accordance with claim 1 wherein said software system is an operating system kernel, said first memory space is a privileged memory space in which said operating system kernel resides, and said second memory space is a non-privileged memory space in which user applications reside.

3. A method in accordance with claim 1 wherein said one or more callable instrumentation functions are placed in said first memory space in conjunction with said software system being placed in said first memory space.

4. A method in accordance with claim 1 wherein said probed operation environment information comprises function arguments and local variables.

5. A method in accordance with claim 1 wherein said probed operation environment information is provided to said second memory space by way of a registration interface in said first memory space that allows said one or more callable instrumentation functions to register said probed operation environment information.

6. A method in accordance with claim 5 wherein said probed operation environment information is further provided to said second memory space by way of a database management system in said first memory space that associates said one or more instrumentation functions and said registered probed operation environment information.

7. A method in accordance with claim 6 wherein said probed operation environment information is further provided to said second memory space by way of said database management system providing said probed operation environment information to communication logic in said first memory space in response to an update to said database management system.

8. A method in accordance with claim 7 wherein said probed operation environment information is further provided to said second memory space by way of said communication logic providing said probed operation environment information received from said database management system to said second memory space.

9. A method in accordance with claim 1 wherein said first memory space addresses are determined from a debug information resource in a file system that is accessible from said second memory space.

10. A method in accordance with claim 1 wherein said probe handler is generated based on a probe script provided in said second memory space.

11. A data processing system programmed for dynamic instrumentation of a running software system, comprising:
    a data processing resource;
    a first memory space;
    a second memory space;
    one or more callable instrumentation functions accessible in said first memory space;
    said one or more callable instrumentation functions being adapted to probe an operation of said software system and return data regarding said probed operation;
    first logic in said first memory space adapted to provide probed operation environment information needed by said one or more instrumentation functions to said second memory space; and
    second logic in said second memory space adapted to adapted to determine first memory space addresses associated with said probed operation environment information generate a probe handler that includes logic for making calls to said one or more instrumentation functions with references to said first memory space addresses.

12. A data processing system in accordance with claim 11 wherein said software system is an operating system kernel, said first memory space is a privileged memory space in which said operating system kernel resides, and said second memory space is a non-privileged memory space in which user applications reside.

13. A data processing system in accordance with claim 11 wherein said one or more callable instrumentation functions reside in said first memory space in conjunction with said software system.

14. A data processing system in accordance with claim 11 wherein said probed operation environment information comprises function arguments and local variables.

15. A data processing system in accordance with claim 11 further including a registration interface in said first memory space that allows said one or more callable instrumentation functions to register said probed operation environment information.

16. A data processing system in accordance with claim 15 further including a database management system in said first memory space that associates said one or more instrumentation functions and said registered probed operation environment information with said probed operation.

17. A data processing system in accordance with claim 16 wherein said first logic in said first memory space comprises communication logic that provides said probed operation environment information to said second memory space.

18. A data processing system in accordance with claim 17 wherein said communication logic is further adapted to receive said probed operation information from said database management system when said database management system is updated.

19. A data processing system in accordance with claim 11 wherein said first memory space addresses are determined from a debug information resource in a file system that is accessible from said second memory space.

20. A data processing system in accordance with claim 11 wherein said logic in said second memory space is adapted to generate said probe handler based on a probe script provided in said second memory space.

21. A computer program product for the dynamic instrumentation of a running software system, comprising:
one or more non-transitory machine readable media;
programming logic provided by said machine readable media for programming a data processing platform to support dynamic instrumentation of said running software system, as by:
providing one or more callable instrumentation functions that are accessible in a first memory space associated with said software system;
said one or more callable instrumentation functions being adapted to probe an operation of said software system and return data regarding said probed operation;
providing probed operation environment information needed by said one or more instrumentation functions to a second memory space associated with said software system;
determining first memory space addresses associated with said probed operation environment information from a resource that is accessible in said second memory space; and
generating a probe handler that includes calls to said one or more instrumentation functions with references to said first memory space addresses, said probe handler being callable as part of said probed operation.

22. A computer program product in accordance with claim 21 wherein said software system is an operating system kernel, said first memory space is a privileged memory space in which said operating system kernel resides, and said second memory space is a non-privileged memory space in which user applications reside.

23. A computer program product in accordance with claim 21 wherein said programming logic is further adapted to place said one or more callable instrumentation functions in said first memory space in conjunction with said software system being placed in said first memory space.

24. A computer program product in accordance with claim 21 wherein said probed operation environment information comprises function arguments and local variables.

25. A computer program product in accordance with claim 21 wherein said programming logic is further adapted to provide a registration interface in said first memory space that allows said one or more callable instrumentation functions to register said probed operation environment information.

26. A computer program product in accordance with claim 25 wherein said programming logic is further adapted to provide a database management system in said first memory space that associates said one or more instrumentation functions and said registered probed operation environment information with said probed operation.

27. A computer program product in accordance with claim 26 wherein said programming logic is further adapted to provide communication logic in said first memory space that provides said probed operation environment information to said second memory space.

28. A computer program product in accordance with claim 27 wherein said communication logic is further adapted to receive said probed operation environment information from said database management system when said database management system is updated.

29. A computer program product in accordance with claim 21 wherein said first memory space addresses are determined from a debug information resource in a file system that is accessible from said second memory space.

30. A computer program product in accordance with claim 21 wherein said probe handler is generated based on a probe script provided in said second memory space.

* * * * *